April 6, 1965 J. ZABORSZKY ETAL 3,177,349

FILTER NETWORK

Filed Oct. 31, 1960 3 Sheets-Sheet 1

INVENTORS
JOHN ZABORSZKY
JOHN W. DIESEL
BY Gravely, Lieder & Woodruff
ATTORNEYS

FILTER NETWORK

Filed Oct. 31, 1960

INVENTORS
JOHN ZABORSZKY
JOHN W. DIESEL
BY Gravely, Lieder & Woodruff
ATTORNEYS

FILTER NETWORK

Filed Oct. 31, 1960 3 Sheets-Sheet 3

*INVENTORS*
JOHN ZABORSZKY
JOHN W. DIESEL
BY Gravely, Lieder & Woodruff
*ATTORNEYS*

United States Patent Office 3,177,349

Patented Apr. 6, 1965

3,177,349
FILTER NETWORK

John Zaborszky, Kirkwood, and John W. Diesel, Brentwood, Mo., assignors to McDonnell Aircraft Corporation, St. Louis, Mo., a corporation of Maryland Filed Oct. 31, 1960, Ser. No. 66,173
13 Claims. (Cl. 235—152)

Briefly, the present invention relates to filter networks, and more particularly to a filter network capable of discriminating between signals on the basis of one or more different parameters, and which is even capable of discriminating between and separating signals of the same frequency.

Filter networks have heretofore been devised which discriminate between two or more signals usually on the basis of frequency. The known filters for the most part operate by attenuating the undesirable signal components more than the desired signal, and are unable to discriminate between signals having the same frequency. Furthermore, the known filters often produce undesirable phase shift and distortion and are unable to completely eliminate the unwanted signals or signal components. For these and other reasons the known filters have been unsatisfactory.

The present invention overcomes these and other disadvantages and shortcomings of the known filters by teaching the construction and operation of a filter network capable of discriminating between signals on the basis of one or more different parameters and is even capable of discriminating between and separating signals of the same as well as different frequencies. Furthermore, the present filter network does not produce undesirable phase shift and distortion and completely suppresses the unwanted signals. The present filter network also produces as a by-product of its filtering operation, data on transfer function of equipment controlled thereby which are needed to make the device adaptable for use with many different kinds of devices. Still further, the output of the present filter at any particular instant of time is based on the exact stored history of a fixed portion of the immediate past variations of the signal being filtered, and so far as known this is not true of any other filters which, if they store information at all, store it in distorted form.

It is therefore a principal object of the present invention to provide a filter capable of separating signals on the basis of using the known mathematical form of one of the signal components to determine from the signal mixture one or several different parameters, of which frequency may or may not be one.

Another object is to provide filter means capable of completely suppressing unwanted signals and signal components.

Another object is to reduce phase shift and distortion in the output of filters.

Another object is to provide a filter that is adaptable and compatible for use with many different kinds of devices and circuits.

Another object is to provide means in a filter circuit for accurately storing information.

Another object is to provide a filter capable of discriminating between signals on the basis of digital information representative thereof.

Another object is to provide a filter that employs curve fitting processes.

Another object is to provide means for improving the operating characteristics and reliability of guidance systems, such as the guidance systems used on manned and unmanned air and space craft.

Still another object is to provide improved means for updating information.

These and other objects and advantages of the present invention will become apparent after considering the following detailed description of one embodiment thereof. Briefly, the subject filter comprises signal input means, computer means for receiving and storing information representing an input signal, means for comparing the stored information with other predetermined and precalculated information, means for upgrading the predetermined and precalculated information, means for selecting and passing on the desired signal information, and means for suppressing the unwanted information. Many refinements and variations of the subject device and of the selected embodiment will become apparent after considering the following detailed description in conjunction with the accompanying drawings, wherein:

Figure 5A:
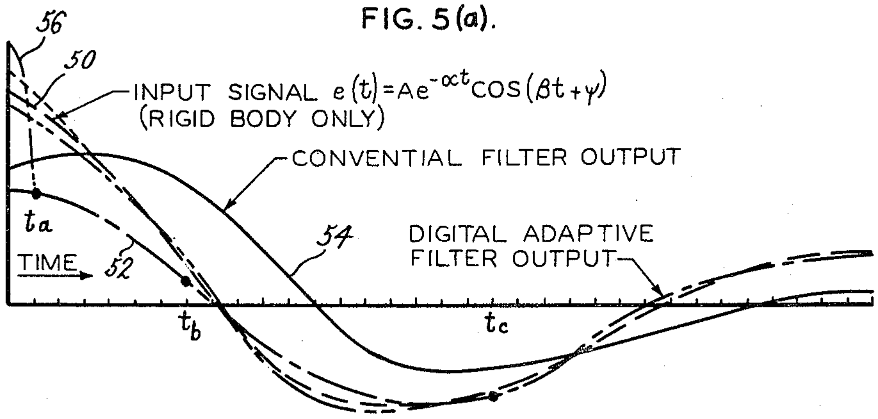
Figure 5B:
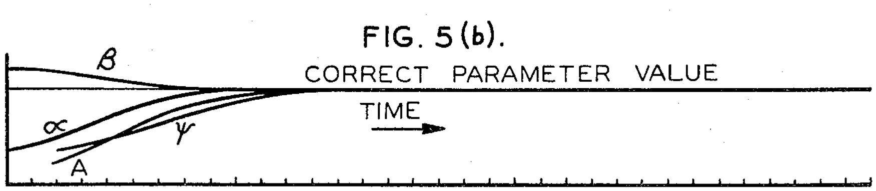
Figure 2A:
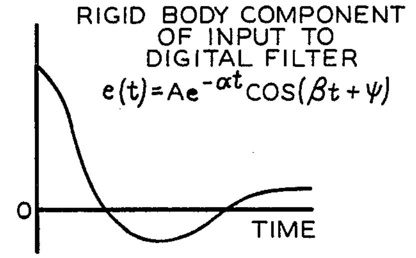
FIG. 2 shows a series of five graphs labeled (*a*), (*b*), (*c*), (*d*), and (*e*) which illustrate a typical input signal and its components which is operated on by the subject filter.
Figure 2B:
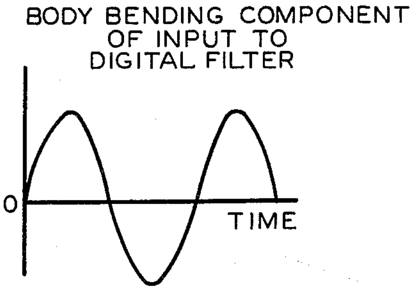
Figure 2C:
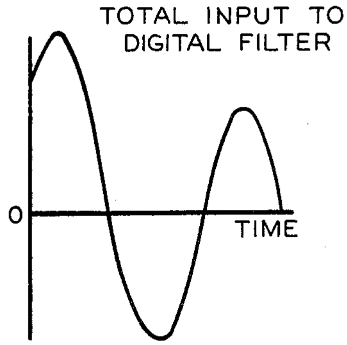
Figure 2D:
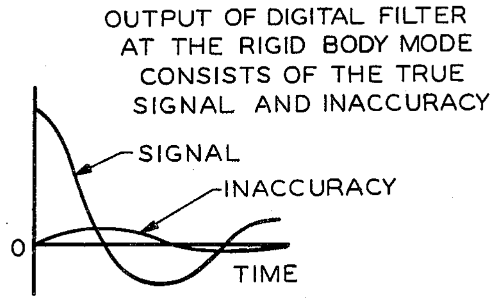
Figure 2E:
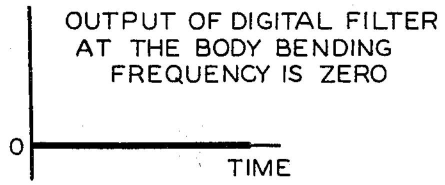
Figure 6A:
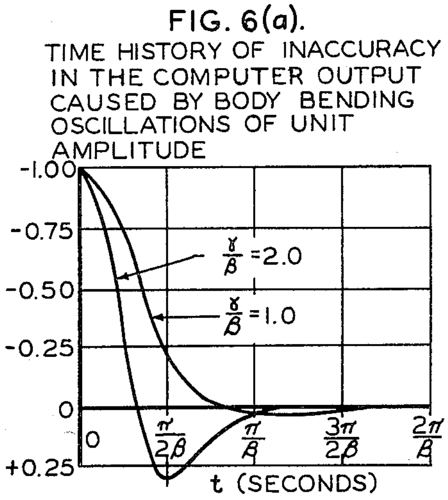
Figure 6B:
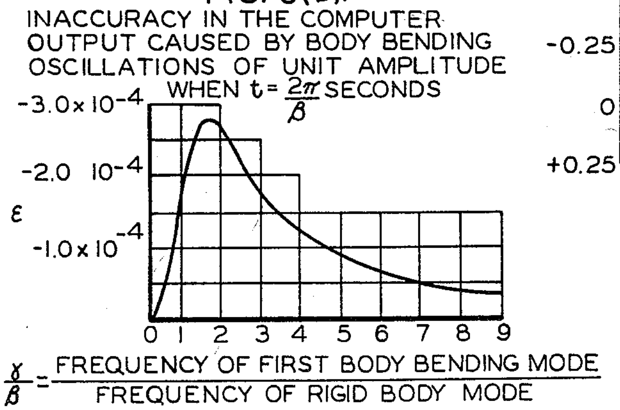

FIGS. 5(*a*) and 5(*b*) are graphs illustrating the various components and parameters of a signal filtered by the subject device such as the input signal shown in FIG. 2(*a*); and FIGS. 6(*a*) and 6(*b*) are graphs illustrating the extent of inaccuracy of the subject filter for a particular application.

Referring to the drawings more particularly by reference numbers, number 10 refers generally to a filter network constructed according to the present invention. The filter 10 has two principal components identified generally by numbers 12 and 14. The component 12 is a comparator circuit, and the component 14 is a rigid body response generator.

For convenience the subject embodiment of the invention will be described as applied to the solution of an air frame or space frame control or guidance problem. In the control and guidance of devices such as air and space frames, and particularly during take off or launching when the body or frame undergoes tremendous stresses, it is important to be able to produce a reliable and dependable signal for guidance purposes. Such a signal must be produced by the rigid body movements and must be free of random components produced by body vibration and other causes which result because of the elastic character of the body when subjected to the aforementioned stresses. For the purposes of this invention the body motions are divided into two main groups. One group is referred to as the rigid body response or mode, and the other as the elastic body response or mode. In the case of a missile launching, these responses or modes can be represented as electrical signals and can be used to control and guide the missile during flight. The rigid body mode is particularly useful and reliable for guidance and control purposes while the elastic body mode is conducive of control instability and may include many spurious components caused by vibration and atmospheric and other conditions making it undesirable for control and guidance purposes. Both modes however, may have the same frequency and both may occur simultaneously to produce a composite signal having components of both modes. However, in most cases the two components will differ in some respect such as in their damping and this is sufficient to enable the present device to separate them.

It is therefore the purpose of the present filter to separate the rigid body mode from the elastic body mode and to generate an output signal corresponding only to the rigid body mode for purposes of control and guidance.

Figure 1:
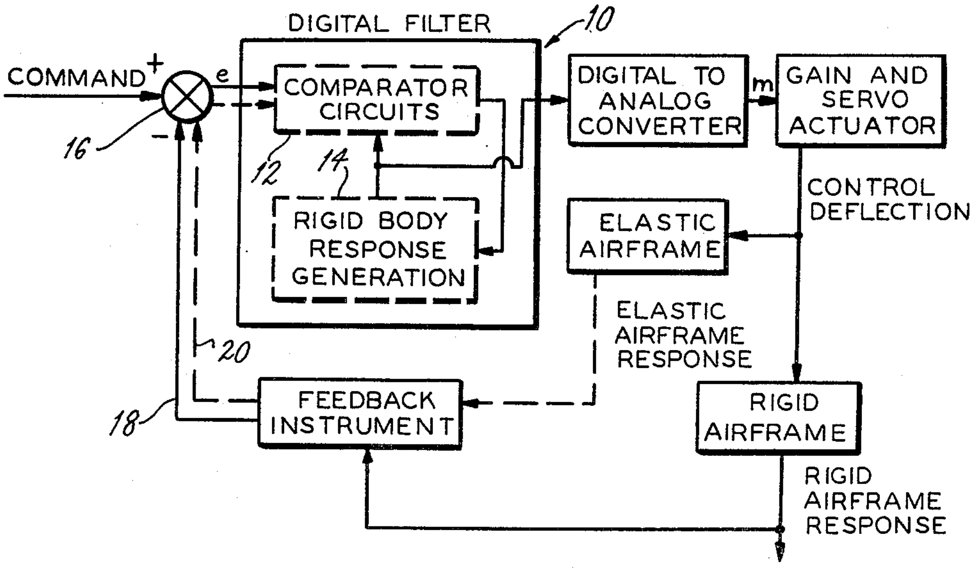
FIG. 1 is a simplified block diagram of a filter network constructed according to the present invention, the filter being shown connected in a control system.

As shown in FIG. 1 the filter 10 is connected to the input control signal "*e*" and is connected between a differential 16 for measuring the difference of command and response and a plurality of interconnected electrical circuits which will be described more fully hereinafter.

The effect of the filter 10 on a particular input signal is illustrated by the sequence of graphs of FIG. 2. Graph 2(*a*) shows a typical input signal component representing only the rigid body mode plotted as a function of time. Graph 2(*b*) shows an input signal component representing only the elastic or body bending mode as a function of time. Graph 2(*c*) shows the total input signal which is obtained by adding together the graphs of FIGS. 2(*a*) and 2(*b*). Graph 2(*d*) shows the output signal from the filter 10. Note that the output signal is substantially the same as the rigid body component shown in FIG. 2(*a*) Note also that the output contains an inaccuracy or error signal component which is relatively small compared to the main output component. The reasons for the inaccuracy component will be described hereinafter. Graph 2(*e*) illustrates that the output of the filter 10 is zero at the frequency of the elastic body mode. This will also be explained more fully.

Figure 3:
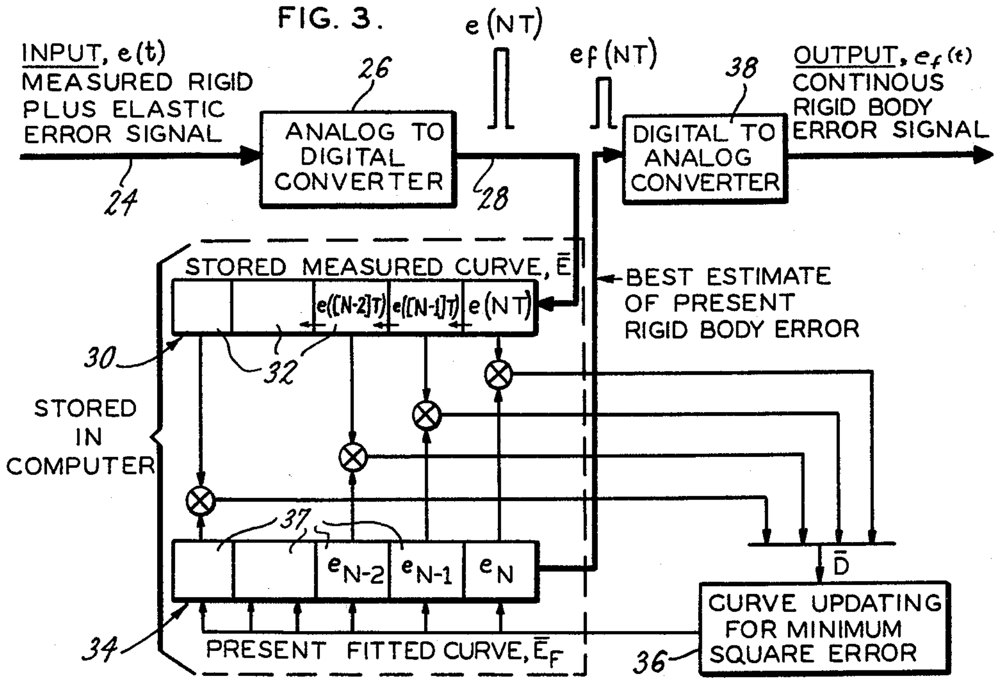
FIGS. 3 and 4 are more detailed schematic block diagrams of the subject filter.
Figure 4:
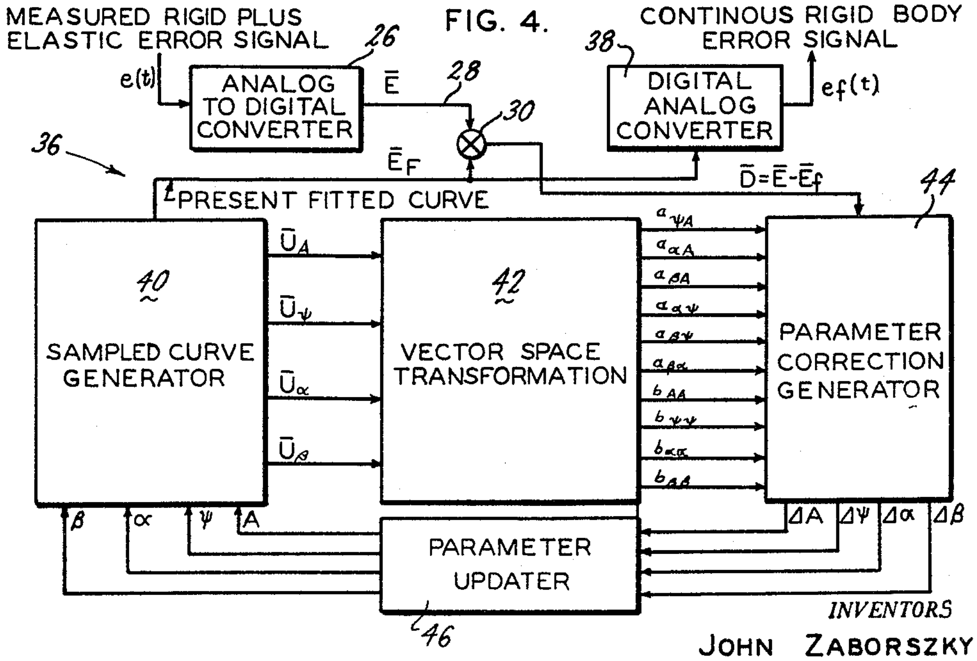

FIGS. 3 and 4 show more in detail the construction and operation of the filter 10. The incoming signal $e_t$ is initially produced in analog or wave form (Graph 2*c*), and is fed on lead 24 to a converter circuit 26. The converter 26 converts the incoming signal into a sequence of samples which correspond to instantaneous voltages of the signal which are taken at preselected time intervals. The more frequently samples are taken the more accurate will they represent the true configuration of the input signal.

The output of the converter 26 is a series of voltage pulses representing the samples and is fed on cable 28 to a computer storage unit 30. The storage unit 30 has a plurality of storage compartments 32, and each compartment, starting from the rightmost compartment and shifting leftwardly (FIG. 3), receives the samples in order from the output of the converter 26. Each time a sample arrives at the rightmost compartment 32, the previously stored samples are shifted one position to the left and the oldest sample in the leftmost storage compartment 32 is dropped.

A second storage or memory unit 34 is also provided and receives an equal number of samples in substantially the same way from a different source, namely from a computer 36. These samples represent the present best estimate as determined by the computer of that part of the input signal which represents the rigid body or desired output mode.

Each time a new sample is fed into the storage unit 30, the corresponding samples in the two storage units 30 and 34 are subtracted from each other and the sequence of these differences is fed into the computer 36 which acts on them so as to update the computer estimate of the rigid body mode.

The computer 36 manipulates the information thus received to produce updated values of the samples. This can be accomplished in several known ways such, for example, as by a method known as "a least squares" computation. The results of these computations represent the best estimate of the rigid body response, and the updated values are then fed to the storage unit 34 leaving the computer 36 free to perform other operations while waiting for another sequence of samples to be delivered to the memory unit 30 from the converter 26.

The value in the rightmost compartment 37 of the storage unit 34 represents the best estimate of the present instantaneous value of the rigid body response. This value is the digital output of the filter and comes in samples synchronized with samples of the error for reasons to be shown.

A conventional digital to analog converter is used to convert the filtered error signal, $e_f(Nt)$, to a continuous form. The short time used by the computer for curve updating, and any transportation lag which may be present in digital to analog conversions, can be compensated for by a greater degree of extrapolation of the present best estimate in the digital filter.

The operations performed by the computer are illustrated in FIG. 3. These operations are organized to produce a minimum square fit to the measured data with a curve which exhibits the general characteristics distinguishing the desired motion component from the undesired motion component. Within any one sampling interval the process is noniterative. FIG. 4 shows an even more detailed summary of the process and as far as possible the components shown in FIG. 4 are similarly numbered to the corresponding components of FIG. 3.

In brief, the incoming signal, in analog form, is converted to a series of digital impulses by the analog to digital converter 26. Thereafter, the digital impulses are fed to and stored in the memory unit 30 while the curve is being updated by the computer 36 and the final output, in digital form, is thereafter converted back to analog form by a digital to analog converter 38 and fed to the output. The output of the converter 38 is the continuous rigid body signal and is used for control guidance, or any other desired purposes.

Symbols are employed in FIG. 4 to identify a sequence of fixed past samples which are used in the curve fitting process. For example, $\overline{E}$ represents a sequence of samples stored in the storage unit 30, and $\overline{E}_F$ represents the present fitted curve as represented by the sequence of samples stored in the storage unit 34.

The latter samples are produced in a sampled curve generator 40 by numerical computations based on the assumed mathematical form of the rigid body response with the best present values of the parameters of the desired components of the response. The sampled curve generator also produces four other output signal vectors identified as $\overline{U}_A$, $\overline{U}_\psi$, $\overline{U}_\alpha$, and $\overline{U}_\beta$. These signals represent partial derivatives of the rigid body curve over a fixed length section of the past, and they serve as coordinate vectors in the continuing computations and curve updating.

A vector space transformation unit 42 (FIG. 4) receives the vectors $\overline{U}_A$, $\overline{U}_\psi$, $\overline{U}_\alpha$, and $\overline{U}_\beta$ and carries out an orthogonalization of these output vectors. A parameter correction generator 44 receives this information from the unit 42 as well as the output information or difference signal $\overline{D}$ from the storage unit 34. The difference signal $\overline{D}$ is the signal produced by subtracting from the incoming signal components, the computed signal components as explained above. In other words the difference signal $\overline{D}$ is the sampled difference between the input signal and the corresponding components of the sampled curve. From these two sources of information the parameter correction generator 44 produces a correction of each of the four parameter vectors $\overline{U}_A$, $\overline{U}_\psi$, $\overline{U}_\alpha$ and $\overline{U}_\beta$. The corrections are determined in such a way as to make a fitted curve, $\overline{E}_F$ best fit the measured input curve $\overline{E}$ in a mean square sense. The fitted curve $\overline{E}_F$ is a particular member of a family of potential rigid body response curves. All members of this family have the same mathematical form but they differ in the value of several parameters (4 in this example).

Considerable mathematics and detailed circuitry are involved in the actual construction of the units 40, 42 and 44 and it is not deemed necessary to this disclosure to go into the details thereof in order to appreciate the invention. Likewise, it is not deemed necessary in order to understand the invention to go into a detailed consideration of the mathematics involved which are fairly complicated and yet involve well known principles.

After the generator 44 has performed its functions of correcting the parameter vectors, the corrections are fed to a parameter updater unit 46 which updates the parameters and feeds the updated values to the sampled curve generator 40. Once a computation has been completed, the computer 36 does not again participate in the filtering operation until the next input sample, $E(Nt)$, is received. It should also be noted that the device shown in the diagram of FIG. 4 represents a closed loop device in which the values of the parameters are repeatedly being updated, and the up-to-date values used to update the sample curve $\overline{E}_F$ generated in the generator 40.

The way in which the present filter operates is illustrated graphically in FIGS. 5 and 6. In FIG. 5 the input signal is represented by the line 50, the output signal from the present filter is illustrated by the line 52, and the output which would be obtained if a conventional filter were used instead of the present filter is illustrated by the line 54. If it is assumed that the latest sample of the input signal is taken at time $t_a$ then the present estimate of the rigid body response at that time is shown by the line 56 which terminates at the dot on the line 52. The line 56 is shown as a continuous line for clarity although actually it exists only as samples which are present in the memory unit 34 (FIG. 3) at the particular instant of time involved. Ideally, the line 56 should overlap the line 50 in order for the estimated sample to be a relatively close approximation of the rigid body mode. However, during the early part of the cycle the estimations are usually relatively poor approximations of the desired signal output because they are based on relatively few data samples. At times $t_b$ and $t_c$, a similar situation exists except that the closeness of the approximation of the line 52 to the line 50 is rapidly improving because more data is available to the computer for calculating the approximations.

The function of the computer is to select one particular curve from a family of damped exponential curves which gives optimum fit to the measured data. There may be an infinite number of curves in the family of curves but only one will possess characteristics which are substantially the same as the desired component. All of the curves in the family of curves are identified by and distinguishable from each other by selected parameters which in the present case are selected to include the parameters of amplitude (A), phase ($\varphi$), frequency ($\beta$), and damping ($\alpha$). The functions of the computer therefore is to select the desired curve that most closely approximates or fits the rigid body mode. This is done by using the computer to obtain information as to the magnitudes of the above named parameters for each measured sample, and the more measured data available to the computer, the more accurate can the parameters be determined and hence the more accurately will the computer be able to select the desired curve. For example, at time zero ($t_0$) a single sample of measured data is available to the computer, and therefore there is no way to tell what part of this belongs to the rigid body signal. Therefore, the error at and shortly after zero time may be substantial. However, as measured data becomes available, the estimated values of the parameters are substantially improved as shown in the graph of FIG. 5(*b*), and in a very short time the estimated values are very close approximation of the rigid body values. In the graph of FIG. 5(*b*) this occurs somewhere between ¼ and ½ cycle of operation. Thereafter, the error which is represented as the difference between the estimated curve and the input signal curve becomes very small and has negligible effect. Accordingly, the output of the filter, which is represented by the line 52 in FIG. 5(*a*), becomes a very close approximation to the rigid body response.

By contrast, the response that would be obtainable if a conventional filter were used is shown by the line 54. This response or output is substantially different from the rigid body response over a considerable number of cycles and results in a time delay and in an error which is conducive to instability and unreliability of the output for control purposes.

In FIG. 6(*a*), is illustrated the speed at which the inaccuracy is reduced in the present filter. Note that the error is substantial during the first portion of the first ¼ cycle and becomes negligible at some point between the first ¼ to ½ cycle. In this illustration as in the illustration of FIG. 5, the filter discriminates between the rigid body response and the elastic body response on the basis of a difference in damping and this can be accomplished regardless of the frequencies of the responses. However, because of the relatively large error that may occur during the initial ¼ cycle of operation, the present device may have its control function delayed so that it will not take over guidance control until sometime after the first ¼ cycle.

It should also be remembered that in an actual device updating of the parameters usually does not take up all of the time of the computer. Therefore, a substantial amount of computer time is available for making other computations. It is also anticipated to use other devices or methods than those disclosed for updating the parameters. For example, it is contemplated to update the parameters in pairs or even in greater numbers thereby reducing the computing time. Still further, it is also contemplated to include a greater or lesser number of parameters depending on the particular application and the accuracy required. It should also be borne in mind that the present filter is primarily a digital device which makes use of the true values of actual samples taken at selected time intervals to calculate the estimated curve for curve fitting and updating purposes. This contributes substantially to the accuracy and reliability of the results.

Thus there has been shown and described a filter network which receives input information in analog form, converts the information to digital form, separates the desired components of the input information from the undesired components by comparing the input information to estimated values of the desired components using computer means capable of operating on actual samples of the input information to estimate the desired components and to update selected parameters used in arriving at the estimations, said updated parameters producing information for comparing with the input information to arrive at the desired output, and means for converting the output to analog form.

Many changes, variations, and modifications of the present device will become apparent to those skilled in the art after considering this specification and the accompanying drawings. All such changes, variations, and modifications which do not depart from the spirit and scope of the invention are deemed to be covered by the invention which is limited only by the claims which follow.

What is claimed is:

1. A filter network for separating components of a signal comprising means for representing a signal having desirable and undesirable components in digital form, computer means for estimating the characteristics of the desired component from the digital representation of the signal, means for updating the estimated characteristics of the desired component in response to receipt of additional digital information as to the signal, and means for comparing the estimated characteristics of the desired component with the signal.

2. A filter device comprising an input circuit connected to an input analog signal source including means for converting an input signal to digital form, computer means connected to the input circuit for computing estimated signal values of a selected one of the components of the input signal, said computer means including means for continuously updating the estimated values being computed in response to the receipt of additional input signal information, means for comparing the estimated signal values and the incoming signal, and an output circuit including means for converting the calculated estimated signal values from digital to analog form.

3. A filter comprising signal input means connected to a signal source, means for converting an input signal into a plurality of instantaneous impulses representing the actual magnitude of the signal at preselected time intervals, means for storing said impulses, means for computing estimated impulses corresponding to a desired component of the signal for comparison with the stored impulses, said last named means including means for receiving and using the stored impulses to update the estimated impulses, means for comparing the estimated impulses with corresponding signal impulses, and output means including means for converting the updated estimated impulses to analog form.

4. A filter for separating a desirable signal component from undesired signal components comprising an input circuit connected to an input signal source capable of producing signals having desirable and undesirable components, means for converting the signal into a series of impulses representing instantaneous values of the magnitude of the signal, means for storing said impulses, means for comparing the stored impulses to estimated values of the desirable component of the signal, said last named means including computer means for computing estimated values for the impulses of the desired component from the stored impulses, means for updating the estimated values of the desired signal impulses in response to the receipt by said computer of more and more of said stored signal impulses, and output means including means for converting the estimated impulses to analog form.

5. A filter device comprising a signal source capable of producing an analog signal having desirable and undesirable components, means for converting the input signal into a series of impulses representing actual values of the input signal at selected instantaneous times, means for orderly storing the impulses, means for comparing the stored impulses with corresponding estimated values of impulses representing the desirable component, said last named means including computer means connected to the impulse storage means and responsive to the stored impulses for computing said estimated impulses, and means including said computer means responsive to the receipt of additional stored impulses for updating the estimated impulses to improve the degree of similarity between the estimated impulses and the input signal as represented by the stored impulses, and output means including means for converting the estimated impulses to analog form.

6. A filter device for separating desired from undesired components of a signal comprising an analog signal source, means for converting a signal from said source to a plurality of impulses representing actual values of the signal at a plurality of selected instants, means for storing the impulses, means for estimating the magnitude of impulses representing the desired component of the signal for comparing with the corresponding stored input impulses, said last named means including computer means connected to the impulse storage means and responsive to the magnitude of the stored input impulses, said computer means including means for updating the magnitudes of the estimated impulses to increase the degree of comparison between the estimated signal representing the desired component and the input signal, and output means including means for converting the estimated impulses to analog form.

7. The filter device defined in claim 6 wherein the input signal is dependent upon a plurality of different signal parameters, and said computer means includes means for updating selected ones of said parameters in response to the receipt of additional impulses representing actual values for the input signal at selected instants of time.

8. A filter device comprising means for producing an input analog signal having desired and undesired components, means for converting the signal to digital form, means for storing the digital form of the signal, means for calculating estimated values representing the desired signal component, means for repeatedly updating the estimated values of the desired component in response to the receipt by the calculating means of more digital information as to the input signal, means for comparing the estimated values of the desired signal component with the stored digital form of the signal, said last named means also including means for subtracting the estimated values of the desired component from the input signal to produce an error signal equal to the difference therebetween, and means for feeding the error signal to the calculating means.

9. The filter defined in claim 8 including means for converting the updated estimated values of the desired component to analog form.

10. A filter device comprising means for producing a signal having desired and undesired components, means for selecting a curve from a family of curves which most nearly approximates the desired component, said last named means including means for storing impulses representing actual sample values of the signal, means responsive to the stored samples for estimating corresponding sample values of the desired signal component, means for updating the estimated sample values including means for subtracting the sample values from corresponding signal values to produce difference values representing an error signal, and means for selecting from a family of curves a curve based on the updated estimated values which most nearly corresponds to the signal.

11. The filter device defined in claim 10 wherein said means for estimating corresponding sample values of the desired component includes means for continuously updating said estimated sample values representing the desired component in response to the receipt by said means of additional stored impulses representing more of the signal.

12. Means for separating two or more components of a signal represented as a sequence of impulses taken at different instants of time comprising means for producing an input signal, means for storing in orderly sequence a plurality of impulses representing the signal, said storage means including means for receiving and storing new impulses representing present instantaneous values of the signal and for simultaneously advancing the plurality of previously stored impulses in the storage means while dropping from the storage means the oldest stored impulses, computer means responsive to the input signal for producing estimated values of the magnitude of impulses representing a particular component of the input signal and for updating said estimated values in response to the receipt of additional input signal information, means for comparing the estimated impulses with corresponding stored input signal impulses, said computing means also including means for subtracting the estimated impulses representing the particular component of the input signal from the corresponding stored input signal impulses to produce impulses representing the difference therebetween, and means for feeding said difference impulses to the computer means to be used in the updating of the estimated impulses to improve the degree of comparison between the input signal and the particular estimated signal.

13. The means for separating signal components defined in claim 12 wherein said computer means includes means for updating selected parameters of the input signal.

References Cited in the file of this patent

UNITED STATES PATENTS 2,896,162 Berger et al. ------------ July 21, 1959